United States Patent [19]

Boldys

[11] Patent Number: 5,446,672

[45] Date of Patent: Aug. 29, 1995

[54] MACHINE MONITORING SYSTEM

[75] Inventor: Michael Boldys, Sterling Heights, Mich.

[73] Assignee: Air Gage Company, Livonia, Mich.

[21] Appl. No.: 287,905

[22] Filed: Aug. 9, 1994

[51] Int. Cl.6 .............................................. G06F 15/46
[52] U.S. Cl. ........................ 364/474.16; 364/474.11; 364/474.17; 364/474.21
[58] Field of Search ...................... 364/474.16–474.21, 364/474.11, 468, 478; 408/6, 18, 8

[56] References Cited

U.S. PATENT DOCUMENTS

| 4,245,316 | 1/1981 | Koikawa et al. | 364/474.17 |
| 4,351,029 | 9/1982 | Maxey et al. | 364/474.17 |
| 4,497,029 | 1/1985 | Kiyokawa | 364/474.17 |
| 4,890,306 | 12/1989 | Noda | 408/6 |
| 5,243,533 | 9/1993 | Takagi et al. | 364/474.17 |
| 5,244,447 | 9/1993 | Tanaka et al. | 364/474.21 |

Primary Examiner—Roy N. Envall, Jr.
Assistant Examiner—Thomas E. Brown
Attorney, Agent, or Firm—Gifford, Krass, Groh, Sprinkle, Patmore, Anderson & Citkowski

[57] ABSTRACT

A machine monitoring system is disclosed for use with a machine which performs cyclic work operations. The monitoring system includes a machine unit adjacent the machine which detects each work cycle of the machine and generates a work cycle output signal representative thereof. A counter in the machine unit then counts the work cycle output signals and generates a count signal representative of the number of machine cycles. This count is displayed on the switches at each machine unit. The machine unit also communicates with a central station which is positioned remotely from the machine. The central station includes a receiver which receives the count output signal from the machine unit. The central station includes a computer which is programmed to compare the count output signal from the machine unit with a predetermined limit count. When the count equals a preset limit count, indicative that maintenance is required, the computer generates a signal to alert the operator at the central station that machine maintenance is required. In practice, the central station monitors the conditions of a plurality of different machines, each of which has a machine unit associated with it for maintenance control purposes. The limit values of each machine unit can also be changed and reprogrammed from the central station.

9 Claims, 5 Drawing Sheets

MACHINE MONITORING SYSTEM

BACKGROUND OF THE INVENTION

I. Field of the Invention

The present invention relates generally to monitoring system and, more particularly, to a machine monitoring system which monitors required maintenance, part inspection or other reminder for the machine operator.

II. Description of the Prior Art

Many manufacturing facilities include numerous machines which performs cyclic work operations. Such machines can include, for example, boring machines, cutting machines, milling machines and the like, Such industrial manufacturing machines require periodic maintenance to ensure not only that the manufactured parts remain within required tolerances, but also for optimum operation of the manufacturing machine. For example, for a boring machine it may be determined that the cutter must be sharpened and/or replaced after a predetermined number of cyclic operation for the machine. If the cutter is not sharpened or replaced after performing the predetermined number of cyclic operations, the parts manufactured by the machine may fall outside the required manufacturing tolerances. Similarly, use of a resharpenable tool beyond its resharpen cycle limit can result in permanent and uncorrectable damage to the tool.

It has been the previous practice for many manufacturing facilities or factories to simply schedule periodic maintenance for the various machines at predetermined time intervals. For example, the cutter or cutters on a particular boring machine may be simply replaced and/or sharpened every eight hours in order to maintain the machined parts within desired manufacturing tolerances. This approach, however, is disadvantageous for a number of reasons.

First, the most important factor for required periodic maintenance is the number of work cycles performed by the machine since the last maintenance operation. In some instances, the machine may be idle for an extended period of time so that performing maintenance on the machine at predetermined time intervals results in excessive and unnecessary maintenance on the machine. This, in turn, increases the overall maintenance cost for the machine and is, therefore, undesirable.

Conversely, the machine may undergo an abnormally large number of work cycles between scheduled maintenance. When this occurs, insufficient maintenance is performed on the machine which can disadvantageously result in unacceptable machined parts.

SUMMARY OF THE PRESENT INVENTION

The present invention provides a machine monitoring system which overcomes all of the i above mentioned disadvantages of the previously known devices.

In brief, the system of the present invention comprises a machine unit which is positioned adjacent the machine. The machine unit includes means for detecting each work cycle of the machine and for generating a work cycle output signal representative thereof. Additionally, a counter contained within the machine unit counts and accumulates each work cycle and generates a count signal representative of the number of machine cycles since the last reset of the counter.

Preferably, the machine unit includes a digital display which displays the count from the counter. Additionally, this digital display is also capable of displaying alpha numeric information in order to alert the machine operator whenever the number of work cycles since the last reset of the counter exceeds a predetermined limit.

In a typical application, a machine unit is associated with each machine requiting periodic maintenance within the manufacturing facility or factory. Consequently, a plurality of different machine units are contained within the manufacturing facility and each machine unit monitors the number of work cycles for its associated machine since the last reset of its associated counter. Additionally, each machine may have a plurality of different tools or maintenance functions, each of which has its own maintenance schedule. In the preferred embodiment, each machine unit monitors up to eight different tools and/or maintenance functions for a single machine.

The machine monitoring system of the present invention further comprises a central station which is positioned remote from the machine units and typically is contained within the management area of the manufacturing facility. The central station includes a computer, such as a personal computer, which electronically communicates with all of the machine units contained within the manufacturing facility. Thus, by the transmission of the appropriate digital signals between the central station and the various machine units, the central station monitors the number of machine cycles for each machine as well as the maintenance schedule for each machine.

The central station is also programmed, either by firmware or software, to compare the machine cycles from the various machine units with preset limits programmed in the central station computer. Thus, whenever the number of machine cycles from a machine unit equals or exceeds a predetermined limit count associated with that particular machine unit, the central station computer generates an output signal alerting the maintenance personal that maintenance on a particular machine within the network is required.

In one form of the invention, the central station utilizes a video display unit associated with a computer to alert the maintenance personal of required maintenance throughout the manufacturing facility. Alternatively, the central station computer is also connected to slave displays which imitate the displays contained at the various machine units as long as the central station computer is operational and updates the slave units.

BRIEF DESCRIPTION OF THE DRAWING

A better understanding of the present invention Will be had upon reference to the following detailed description, when read inconjunction with the accompany drawing, wherein like reference characters refer to like parts throughout the several views, and in which.

DETAILED DESCRIPTION OF A PREFERRED EMBODIMENT OF THE PRESENT INVENTION

Figure 1:
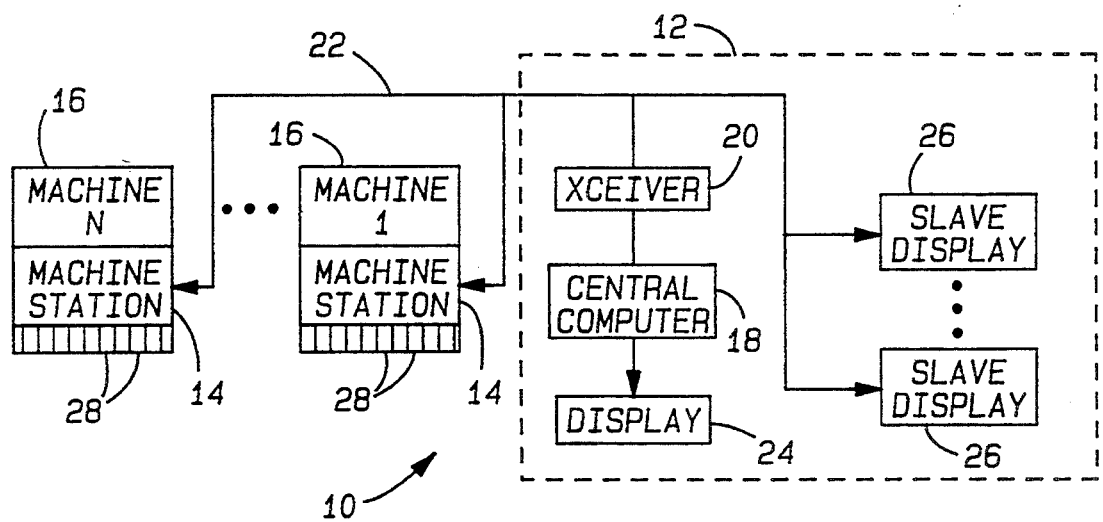
FIG. 1 is a block diagrammatic view illustrating the machine monitoring system of the present invention.

With reference first to FIG. 1, a block diagrammatic view of the machine monitoring system 10 of the present invention is thereshown and comprises a central station 12 as well as a plurality of machine units 14. Each machine units 14 is associated with a machine 16 which performs cyclic manufacturing, processing and/or assembly operations. The machine 16 can comprise boring machines, cutting machines, presses, torque wrenches, gages and the like and require periodic maintenance. Additionally, each machine unit 14 is positioned adjacent to its associated machine 16, while the central station 12 is positioned remotely from the machine units 14.

Still referring to FIG. 1, the central station 12 includes a computer 18, such as a desk top or personal computer. This computer 18 communicates with each machine unit 14 via a transceiver 20 as well as a data communication line 22. The protocol by which the computer 18 communicates with the various remote machine units 14 will be subsequently described in greater detail.

The central station 12 includes a video display 24 which displays information to the operator of the computer 18. The computer 18, in one form of the invention, also controls a plurality of slave displays 26 which mimic displays 28 contained at each of the machine units 14.

Figure 2:
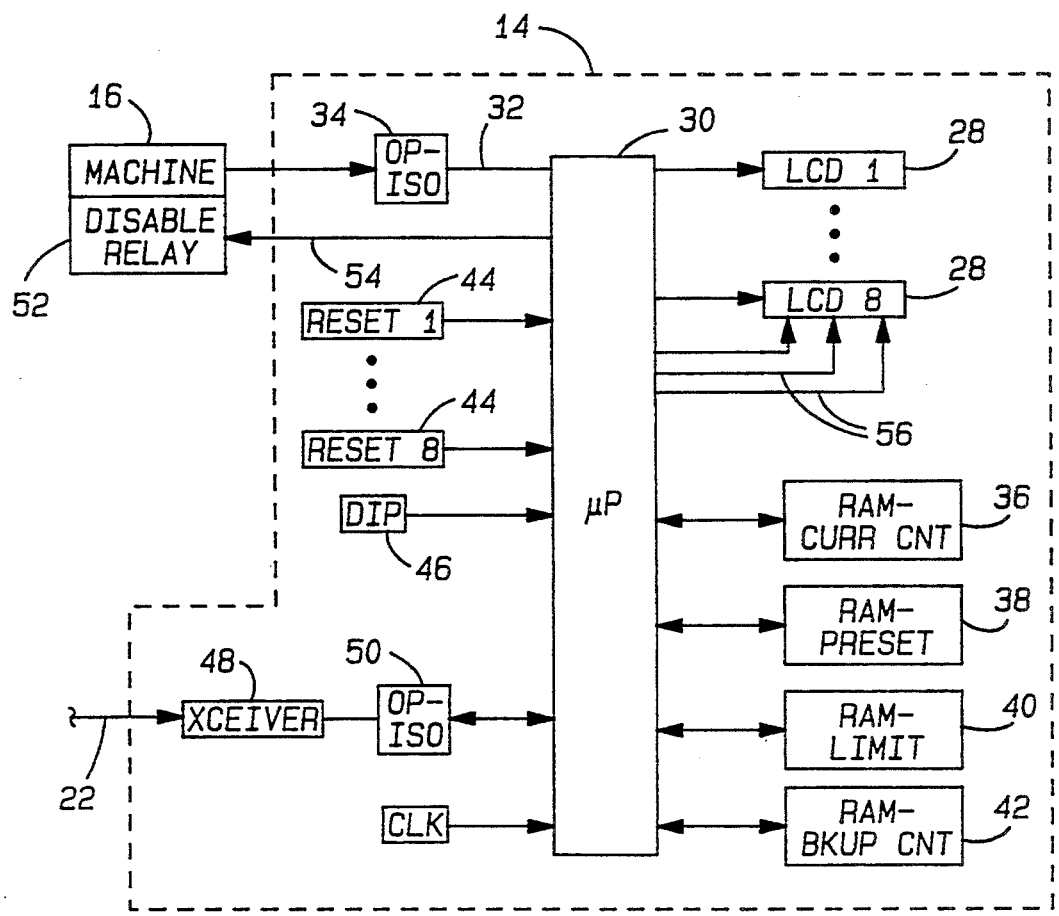
FIG. 2 is a block diagrammatic view illustrating a single machine unit associated with a single machine.

With reference now to FIG. 2, a block diagrammatic view of a single machine unit 14 is thereshown. The machine unit 14 includes a microprocessor 30 which receives an input signal on line 32 via an optical isolator 34 whenever the machine 16 performs a machine operation, i.e. undergoes a machine cycle. In response to each machine cycle, the microprocessor 30 updates random access memory location 36 which contains the current count from the machine 16, i.e. the number of machine cycles since the preceeding reset following a maintenance operation.

In the preferred embodiment of the invention, up to eight different tools and/or maintenance operations are monitored by the machine unit 14 as well as the monitoring system 10 for each machine 16. Furthermore, each maintenance operation must be performed after a predetermined number of machine cycles of the machine 16 but the number of machine cycles before maintenance is required varies between the different tools and/or maintenance functions for each machine. Consequently, the current count RAM access memory 36 comprises eight different memory locations wherein the first memory location contains the count since the last reset for the first tool or maintenance operation, the second memory location contains the count of a number of work cycles of the machine 16 since the last reset for the second tool or maintenance operation (hereinafter collectively called "maintenance operation") and so forth.

One memory display 28 is associated with each maintenance operation so that up to eight different displays 28 are associated with each machine unit 14. Furthermore, in response to a machine cycle input signal on line 32, the microprocessor 30 updates the displays 28 for each of the maintenance operations. Although each display 28 is preferably in the form of a down counter which is decremented for each machine cycle, alternatively, the memory displays 28 can display the result of an up counter for each of the maintenance operations.

The machine unit 14 also includes eight memory locations 38 which contain the reset value, i.e. the initial count for each of the eight maintenance operations. Similarly, the machine unit 14 includes eight memory locations 40 which contain the limit values for each of the eight maintenance operations. These limit values are used as the threshold value for alerting the maintenance personnel that a maintenance operation should be performed. Lastly eight memory locations 42 contain a backup of the current count for each of the eight maintenance operations.

All of the random access memory locations 36, 38, 40 and 42 are electrically connected as input/output signals to the microprocessor 30. Furthermore, preferably each of the random access memory locations 36, 38, 40 and 42 includes a battery backup (not shown) in order, to maintain the integrity of the random access memory 36–42 in the event of a power failure.

Still referring to FIG. 2, a reset switch 44 is associated with each of the eight maintenance operations for the machine 16 so that eight reset buttons 44 are provided at each machine unit 14. Each reset switch 44 is electrically connected as an input signal to the microprocessor 30 and, in practice, each switch 44 is activated by the machine operator following completion of the particular maintenance operation on the machine 16. A machine address means 46, such as a DIP switch, also provides an input signal to the microprocessor 30. The setting for each address means 46 is unique for each different machine unit 14 and enables the central station 12 to selectively communicate with the various different machine units 14.

Still referring to FIG. 2, the dam transmission line 22 from the central station 12 is coupled through a transceiver 48 and optoisolator 50 to the microprocessor 30. The transceiver 38 allows bi-directional data communication between the central station 12 and each machine unit 14.

In certain situations, it is desirable to disable the machine 16 until certain maintenance is performed. Such a situation could arise, for example, where continued operation of the machine 16 without the required maintenance could result in damage to the machine 16 and/or injury to machine personnel.

In order to avoid this situation, a disable relay 52 is preferably associated with the machine 16 so that activation of a disable relay 52 prohibits continued operation of the machine 16. An output line 54 from the microprocessor 30 is utilized to activate the disabled relay 52 in these circumstances.

In the preferred embodiment of the invention, each of the displays 28 are illuminated in at least two and preferably three different colors. For example, the color green would represent an acceptable operating condition, the color yellow would represent a warning condition and, similarly, the color red would represent a stop condition for the machine operator. Appropriate control lines 56 from the microprocessor 30 are utilized to control the color of each of the eight displays 28.

Figure 3:
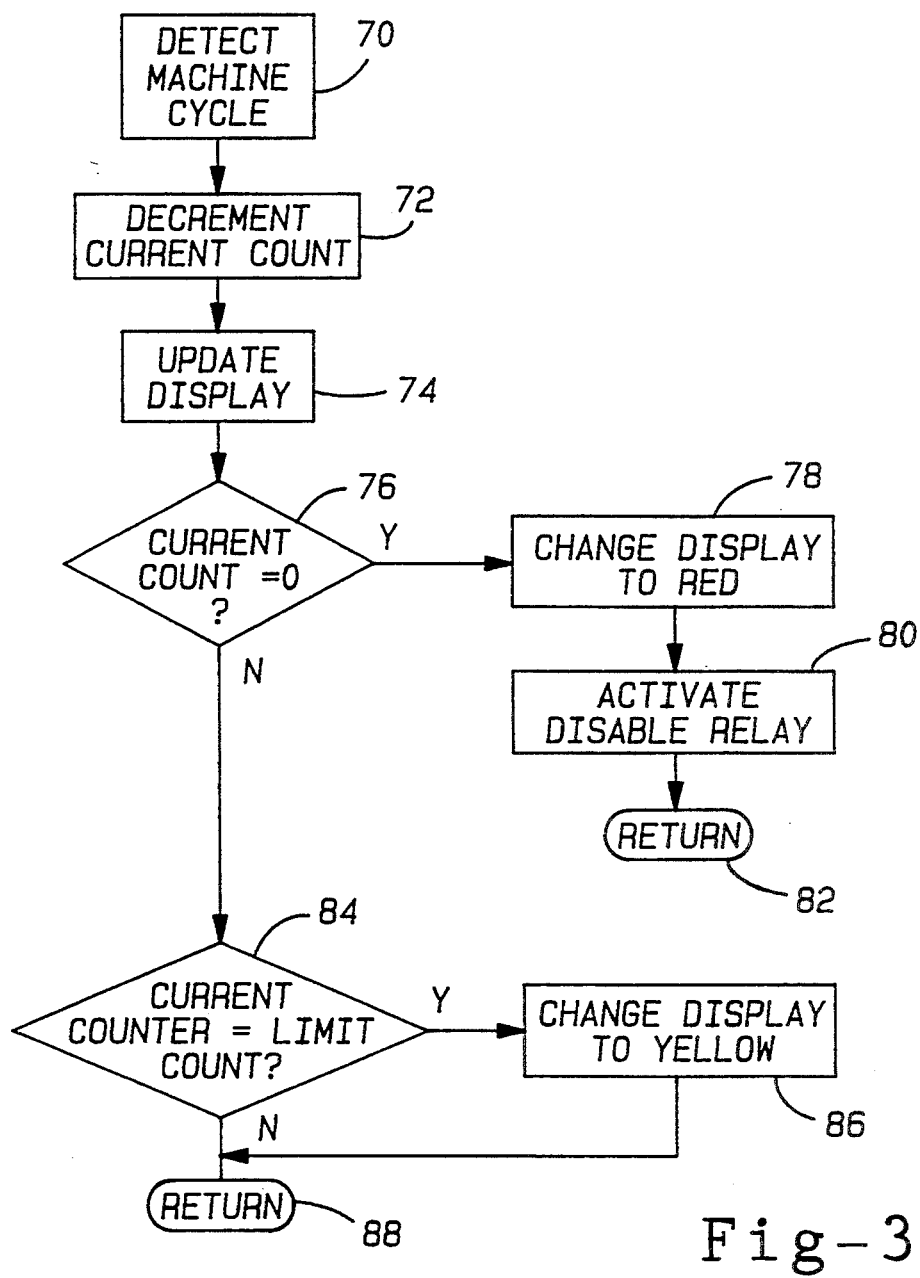
FIG. 3 is a flow chart illustrating the operation of the machine unit in response to the detection of a machine cycle.

The microprocessor 30 at each machine unit 14 operates under control of a computer program. With reference then to FIG. 3, a flow chart illustrating the operation of the computer program for each microprocessor 30 in response to a machine cycle is thereshown. At step 70 the microprocessor 30 detects a machine cycle from its input line 32 and then branches to step 72. At step 72, the microprocessor 30 decrements each of the current counters 36 as well as the back up current counters 42. Step 72 then branches to step 74 in which the microprocessor 30 updates the displays 28 for each of the machine maintenance operations.

Step 74 then branches to step 76 which compares the current count in each of the counters 36 to zero. In the event that a zero count has been reached, indicative that machine maintenance is required, step 76 branches to step 78 which changes the color of the display 28 which is now equal to zero to the color red by activating the appropriate output line 56. Step 78 then optionally branches to step 80 which activates the disable relay 52 for the machine and prohibits further operation of the machine. Step 80 then branches to step 82 and returns.

Conversely, assuming that the current count is not equal to zero, step 76 instead branches to step 84 which compares the current counter in memory 36 with the limit counter in memory 443. If the current count is equal or less than the limit counter, step 84 branches to step 86 whereupon the microprocessor 30 changes the color of the respective display 28 to the color yellow to indicate a warning condition to the machine operator. Step 86 then branches to step 88 and returns.

Lastly, assuming that the current counter is not equal to or less than the limit counter, indicative of normal operation of the machine 16, step 84 branches to step 88 and returns, leaving the switch at the green color.

It will be understood, of course, that each of the operations described above with respect to FIG. 3 are performed for each of the up to eight maintenance operations for the machine 16.

Whenever a maintenance operation is performed on the machine 16, the appropriate reset button 44 corresponding to the particular maintenance operation is depressed by the maintenance personnel in order to reset the maintenance cycle. In the event that an incorrect button 44 is depressed, the maintenance counter can be reset to its original count by again pushing the particular button 44 and maintaining the button 44 depressed for a predetermined period of time, e.g. two seconds.

Figure 5:
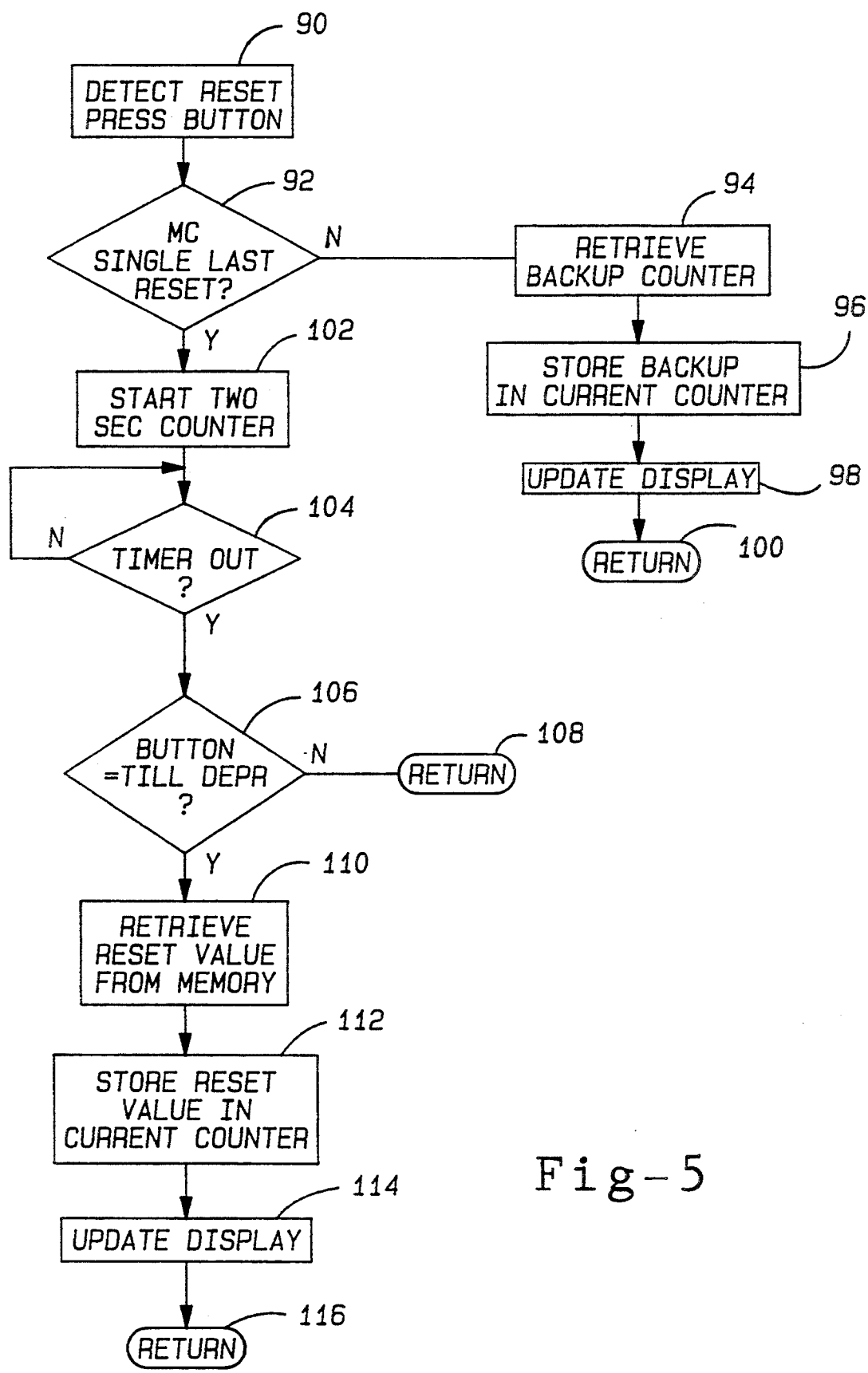
FIG. 5 is a flow chart illustrating the operation of the machine unit in response to a push button entry at the machine unit.

With reference now to FIG. 5, a flow chart illustrating the operation of the microprocessor 30 at the machine unit 14 in response to the depression of one of the buttons 44 is thereshown. At step 90 the microprocessor detects the depression of one of the reset buttons 44 and then branches to step 92.

At step 92 the microprocessor 30 determines if a machine cycle has occurred since the last depression of the reset button 44. If not, indicative that an incorrect button has been depressed, step 92 branches to step 94 where the microprocessor 30 retrieves the count from the backup current counter memory location 42. Step 94 then branches to step 96 where the count from the backup current counter memory location 42 is stored in the current counter 36. The microprocessor then updates the display 28 at step 98 and returns at step 100.

In the event that a machine cycle has occurred since the last depression of the reset button 44, step 92 instead branches to step 102 which initiates a two second timer. Step 102 then branches to step 104 which determines if the two second timer has elapsed. If so, step 104 branches to step 106 which determines if the reset button 44 is still depressed. If not, indicative that the reset button 44 was only momentarily and perhaps inadvertently depressed, step 106 branches to step 108 and returns.

The two second timer 102 together with steps 104 and 106 requires that the reset button 44 be depressed for a predetermined period of time, i.e. two seconds, before a reset will actually occur. This provision thus prevents accidental resets of the current counters 36.

Assuming that the reset button 44 is still depressed after two seconds, indicative that resetting the current counter for a particular maintenance operation is, in fact, desired, step 106 branches to step 110 which receives the reset value from the memory location 38. Step 112 then stores the reset value from memory location 38 in the current counter memory 36 as well as the backup counter memory 42. Step 112 then branches to step 114 which updates the display 28 and then returns via step 116.

Referring now to FIGS. 1 and 2, the transceiver 20 associated with the central station 12, as well as the transceivers 48 associated with each machine unit 14 allows bi-directional data communication between the central station 12 and each of the machine unit 14. In the preferred form of the invention, the central station 12 can request all reset values, all current values, and all limit values of any particular machine unit 14. Similarly, the central station 12 is capable of changing all or a single reset value, current count or limit value for each individual station 16.

Preferably, asynchronous communication is utilized between the central station 12 and the machine units 14. In order to initiate a communication of data between the central station 12 and any particular machine unit 14, the central station 12 transmits a series of digital bytes representative of the particular desired command and the target, i.e. the particular machine unit 14, for the particular command as well as any associated data.

For example, in order to change all reset values for a particular machine unit 14, the central station 12 transmits data bytes along the data transmission line 22 indicative of (1) the start of the data, (2) the identification of the target machine unit as determined by the machine address means 445, (3) a byte representative of the particular command, i.e. "change all reset values" followed by the data representing the new reset values. Such a data transmission protocol would also preferably include a check sum to verify the integrity of the data transmission as well as an end of data marker. The particular format or protocol of the data transmission between the central station 12 and the various machine units 14 may, of course, change without deviation from either the spirit or the scope of the invention.

Figure 4A:
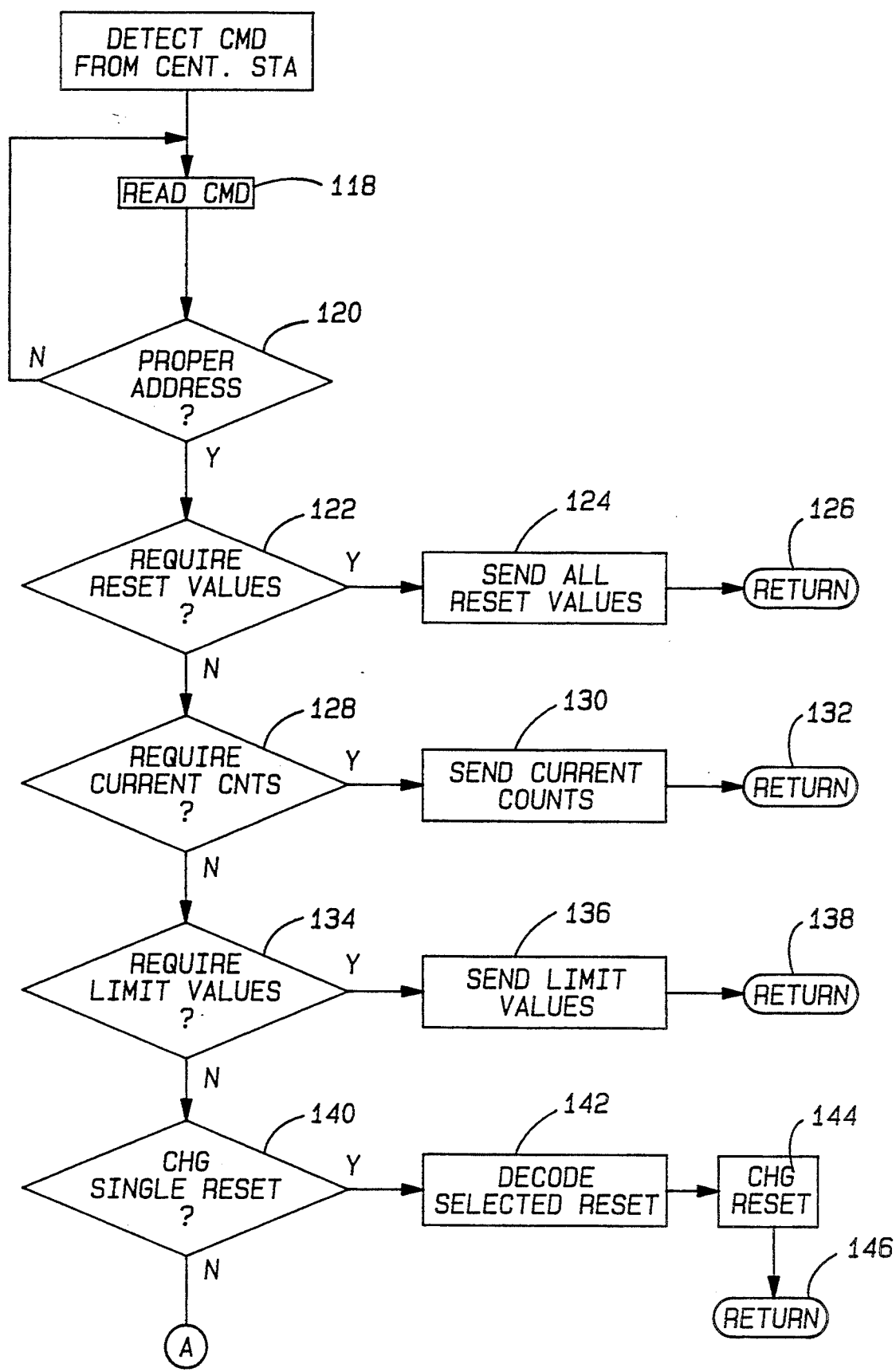
FIGS. 4a and 4b are flow charts illustrating the operation of the machine unit in response to a command from the central station.
Figure 4B:
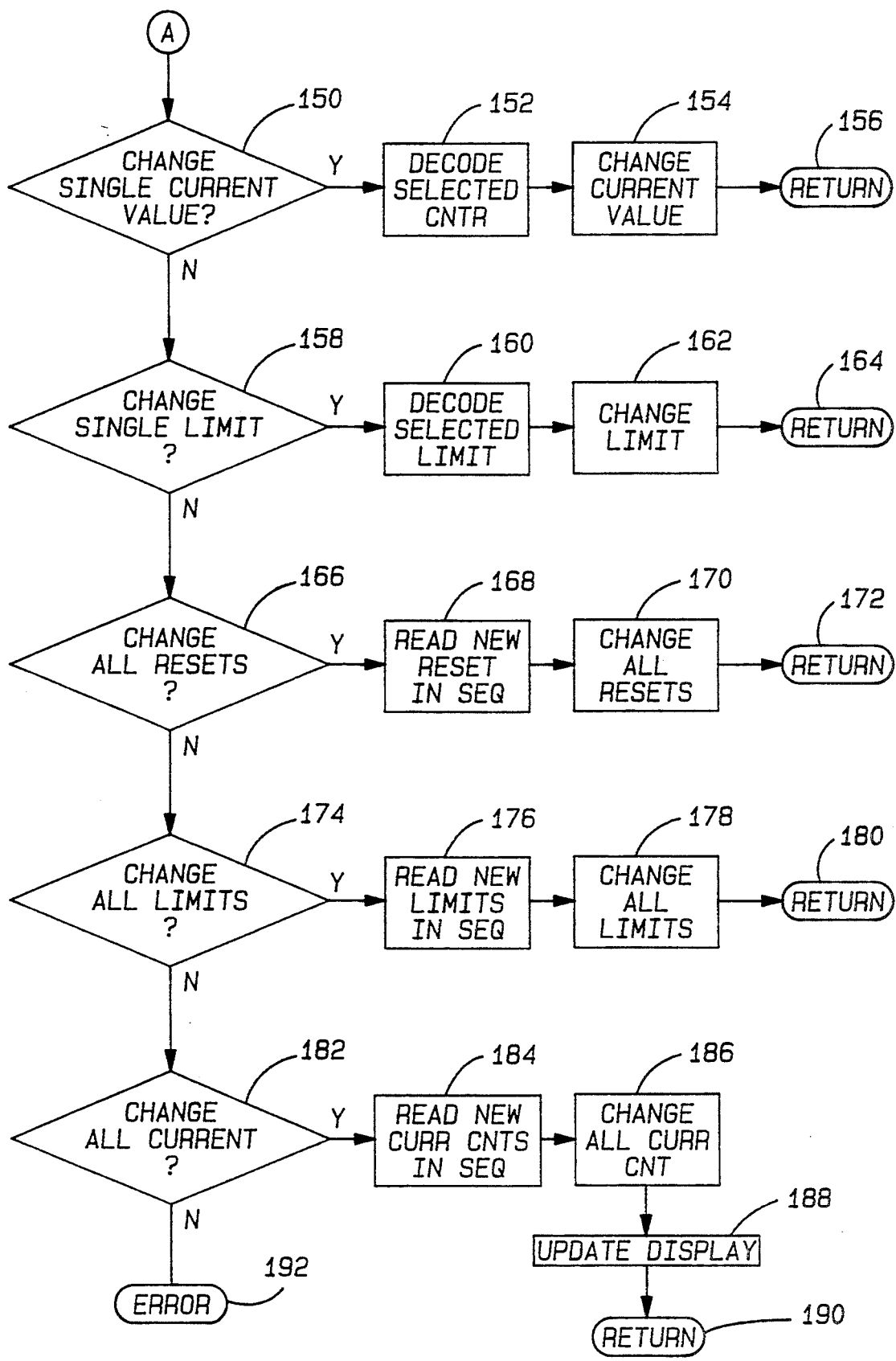

With reference then to FIGS. 4A and 4B, a flow chart illustrating the operation of the machine unit 14 in response to a command from the central station 12 is thereshown. At step 118, the microprocessor 30 at the machine unit identifies the type of command 118, i.e. "change all reset values", "read all reset values", etc. Step 118 then branches to step 120 which compares the machine address transmitted from the central station 12 to the machine address from the machine address means 46 associated with the machine unit 14. If the address does not match, indicative that the command from the central station 12 is directed to a different machine unit 14, step 120 merely branches back to step 118 and awaits for a subsequent command from the central station 12.

Assuming that the command address from the central station 12 matches the machine address from the means 46, step 120 branches to step 122 which determines if the command from the central station 12 is a request to receive all reset values from the machine unit 14. If so, step 122 branches to the step 124 whereupon the machine unit 14 transmits all reset values for each of its eight maintenance operations from the memory locations 38 to the central station 12 and then returns at step 126.

If the command is not a request to receive all reset values, step 122 branches to step 128 which determines if the command is requested from the central station 12 to receive all current counts. If so, step 128 branches to step 130 whereupon the machine unit 14 transmits all current counts from the memory locations 36 back to the central station 12 and then returns at step 132.

If the command was not a request to receive all current counts, step 128 branches to step 134 which determines if the command is a request from the central station 12 to receive all limit values from the machine unit 14. If so, step 134 branches to step 136 and transmits all limit values from memory locations 40 to the central station 12 and then returns at step 138.

If the command was not a request to receive all limit values, step 134 instead branches to step 140 and determines if the command from the central station 12 is a command to change a single reset value, i.e. to change one of the eight maintenance operation counters 28 in one memory location 36 at the machine unit 14. If so, step 140 branches to step 142 which decodes the new reset value from the central station 12 as well as the reset memory location 38 to be reset, and then branches to step 144. At step 144, the microprocessor 30 changes the particular reset value in one of the memory locations 38 and then returns at step 146.

If the command was not a command to change a single reset value, step 140 instead branches to step 150 which determines if the command from the central station 12 was a command to change a single current value. If so, step 150 branches to step 152 which decodes the new value for the current count as well as the particular current counter to be changed. Step 152 then branches to step 154 at which the microprocessor 30 changes the appropriate memory address 36 and then returns at step 156.

If the command from the central station was not a command to change a single current value, step 150 branches to step 158 which determines if the commands from the central station 12 is a command to change a single limit value at the machine unit 14. If so, step 158 branches to step 160 which decodes both the new limit value as well as which of the eight limit memory locations 40 to be changed. Step 160 then branches to step 162 whereupon the microprocessor 30 changes the limit value in the appropriate memory location 40 and then exits at step 164.

If the command was not a command to change a single limit, step 158 branches to step 166 which determines if the command was a command to change all reset values at the machine unit 14. If so, step 166 branches to step 168 where the microprocessor 30 reads all new reset values from the central station for each of the eight maintenance operations. Step 168 then branches to step 170 which updates the reset values in memory 38 and then exits at step 172.

If the command was not a command to change all reset values, step 166 instead branches to step 174 which determines if the command from the central station 12 is a command to change all limit values. If so, step 174 branches to step 176 at which the microprocessor 30 reads all new values for the limit memory locations 40 from the central station 12. Step 176 then branches to step 178 which updates the limit memory locations 40 and then to step 180 and returns.

If the command is not a command to read all limit values, step 174 branches to step 182 which determines if the command is a command to change all current values. If so, step 182 branches to step 184 which reads the new current values from the central station 12. Step 184 then branches to step 186 which updates the current counts in memory locations 36 and then to step 188 which updates the displays 28 and finally returns at step 190.

There are no other commands in this example for the machine unit 14 to execute. Consequently, if step 182 determines that the command is not a command to change all current counters, step 182 branches to step 192 indicating that an error has occurred. Any conventional error handling routine is then performed.

Figure 6A:
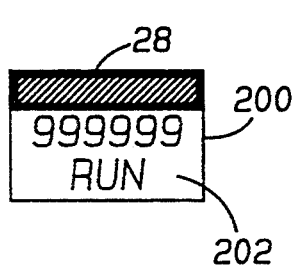
FIG. 6a-6c are exemplary displays at the machine unit.
Figure 6B:
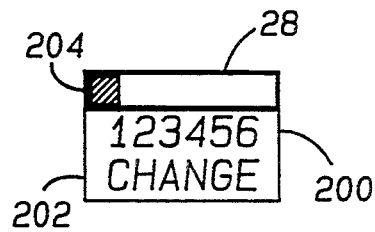
Figure 6C:
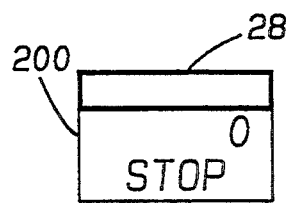

With reference now to FIGS. 6A, 6B and 6C, an exemplary display for a single maintenance operation or tool at a single machine unit 14 is thereshown. In the preferred embodiment, eight such displays 28 are contained at each machine unit 12. FIG. 6a represents the display 28 in a normal operating condition, i.e. maintenance is not required. In this condition, the display 28 includes a numeric line 200 indicative of the number of machine cycles. Preferably, the display line 200 represents the maximum machine cycles for a particular maintenance operation or tool on the machine 16 until maintenance is required and is decremented or counts down for each machine cycle. The display also preferably includes an alpha numeric line 202 to provide useful information to the machine operator, e.g. continued operation of the machine is acceptable. The display in FIG. 6a is preferably illuminated green to indicate a "go" condition.

With reference now to FIG. 6b, when the current count reaches the limit count, indicative that maintenance should be performed soon, the line 200 displays the count representative of the machine cycle count. However, in FIG. 6b, the microprocessor 30 has changed the color of the display to yellow by control signals on line 56 (FIG. 2) to indicate a warning signal to the machine operator. Similarly, the alpha numeric display 202 changes from "run" to "change" to instruct the machine operator that tool maintenance is required. At this point, however, continued operation of the machine is permitted.

Ultimately, if no machine maintenance is performed, the current count counter 200 reaches 0 as shown in FIG. 6C. At this time, the microprocessor 30 changes the color of the display to red via control line 56 FIG. 2) and changes the alpha numeric display 202 to the word "stop". This indicates to the machine operator that continued operation of the machine is not permitted. At this time, as previously described, the microprocessor 30 may also activate the disable relay 52 (FIG. 2) on the machine 16 to temporarily inhibit the automatic cycle mode of the machine 16.

Still referring to FIGS. 6A–6C, the display 28 also preferably includes a bar line 204 across its upper end. This bar chart 204 graphically illustrates the remaining amount of operation of the machine before required maintenance.

In a preferred form of the invention, one reset button 44 is incorporated in each display 28. Thus, following completion of the maintenance operation on the particular tool, the display 28 is merely depressed for two seconds, thus depressing the display button 44, in order to reset the current counter, i.e. memory location 36 associated with the display. Upon reset, the reset value from memory location 38 is stored in the current counter memory location 36.

In practice, each machine 16 may have up to eight different maintenance operations or tools, each of which has its own maintenance schedule. A reset count, indicative of the maximum number of machine operations for that particular tool, is associated with each tool. Similarly, a limit counter, indicative of the time that maintenance should be performed on that particular tool, is also associated with each tool. Each tool likewise has its own separate display 28.

During the operation of the machine, the displays at the machine unit change from green to yellow as maintenance on the particular tool is required. When the maintenance is actually performed, the display 28 is depressed thus resetting the current counter for that particular tool back to its reset value.

During the entire operation of the machine 16, the central station 12 continually polls each of the machine units 14 on the network to determine the status of each the eight tools and each of the machines 16. The central computer 12 continuously updates the slave displays 26, in one form of the invention, at the central station 12 as well as the screen display 24. Whenever the current count for any of the tools, on any of the machines in the network equals or falls below its limit value, indicative that maintenance or some other periodic check should performed, the central station alerts management personnel at the central station of the particular maintenance or periodic check that is required and simultaneously alerts the machine operator of the same information.

In one alternative form of the invention, the central station also includes displays 28 which mimic the displays at each of the machine units 14. The only difference between the slave displays 26 (FIG. 1) at the central station 12 and the corresponding displays 28 at the various machine units 14 is that the slave displays 26 at the central station 12 change solely in response to command signals from the computer 18.

From the foregoing, it can be seen that the machine monitoring system of the present invention provides a unique and effective system for monitoring the status of numerous machines, each of which may have several tools which require periodic maintenance. Furthermore, all such monitoring of the machine units 14 can be performed from a single central location for increased efficiency.

Having described my invention, however, many modifications thereto will become apparent to those skilled in the art to which it pertains without deviation from the spirit of the invention as defined by the scope of the appended claims.

I claim:

1. A machine monitoring system for use with a plurality of machines, each of which performs cyclic work operations comprising:

a machine unit adjacent each of said plurality of machines, each of said machine units comprising.

means for detecting each work cycle for a plurality of tools of the machine and for generating work cycle output signals representative of each tool thereof;

means for detecting each work cycle for a plurality of maintenance functions of the machines and for generating work cycle output signals representative of each said maintenance function thereof;

means for counting said work cycle output signals representative of each of said tools and for generating count output signals thereof;

means for counting said work cycle output signals representative of each of said maintenance functions of the machines and for generating count output signals thereof;

a central station remote from said monitoring system, said central station system comprising:

means for receiving said count output signals from said machine unit;

means for comparing said count output signals with predetermined limit counts for each of said plurality, of tools indicative of the status of each of said plurality, of tools and means for generating output signals corresponding to the status of said tools;

means for comparing said count output signals with predetermined limit counts for each of said maintenance functions of the machines and means for generating output signals corresponding to status of said machines;

means for activating an alarm when said output count equals said limit count.

2. The invention as defined in claim 1 wherein said machine unit comprises means for resetting said counting means to a preset initial count.

3. The invention as defined in claim 1 wherein each said machine unit comprises means for displaying the magnitude of said count output signal.

4. The invention as defined in claim 3 wherein each said machine unit comprises means for illuminating said display with a first color, means for comparing said count output signal with a preset limit count and means for illuminating said display with a second color when said count output signal equals said limit count.

5. The invention as defined in claim 4 wherein each said machine unit comprises means for comparing said count output signal with a preset stop count and means for illuminating said display with a third color when said count output signal equals said stop count.

6. The invention as defined in claim 3 wherein said display means comprises a liquid crystal display.

7. The invention as defined in claim 1 and comprising a digital data communication line extending between each said machine unit and said central station, said count output signal being transmitted from each said machine unit through said data communication line to said receiving means.

8. The invention as defined in claim 7 and comprising a plurality of machine units, each machine unit being associated with its respective machine, each machine unit being electrically connected with said data communication line, and wherein each said machine unit includes a unique machine address means.

9. The invention as defined in claim 8 wherein said machine unit comprises a preprogrammed computer.

* * * * *